US006529896B1

United States Patent
Leung et al.

(10) Patent No.: US 6,529,896 B1
(45) Date of Patent: Mar. 4, 2003

(54) METHOD OF OPTIMIZING A QUERY HAVING AN EXISTI SUBQUERY AND A NOT-EXISTS SUBQUERY

(75) Inventors: Ting Yu Leung, San Jose, CA (US); Tuong Chanh Truong, San Jose, CA (US); Monica Sachiye Urata, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,471

(22) Filed: Feb. 17, 2000

(51) Int. Cl.[7] .............................................. G06F 17/30
(52) U.S. Cl. ....................................................... 707/2
(58) Field of Search ............................ 707/1–10, 103 R (56) References Cited

U.S. PATENT DOCUMENTS

| | | | |
|---|---|---|---|
| 5,367,675 A | * | 11/1994 | Cheng et al. ................... 707/2 |
| 5,659,725 A | * | 8/1997 | Levy et al. ...................... 707/3 |
| 5,732,258 A | * | 3/1998 | Jakobsson et al. ............. 707/2 |
| 5,799,302 A | | 8/1998 | Castelli et al. |
| 5,895,470 A | | 4/1999 | Pirolli et al. |

* cited by examiner

*Primary Examiner*—Jean R. Homere
*Assistant Examiner*—Mohammad Ali
(74) *Attorney, Agent, or Firm*—Sandra M. Parker, Esq.

(57) ABSTRACT

An optimization technique for SQL queries, a program storage device storing the optimization program, and an apparatus for optimizing a query is provided. A query is analyzed to determine whether it includes the WHERE clause which contains an "EXISTS" subquery and a "NOT EXISTS" subquery, or EXISTS-equivalent subqueries, in Boolean factor. If so, the subsumption test is performed on two subqueries. Then, the compensation predicate is applied to one of them, to perform the QGM transformation of the query. One subquery block is stacked on top of the other subquery block, in order to eliminate one subquery. This procedure allows the transformed query to perform more efficiently than the original query while providing same results. The query is then executed in the computer to efficiently retrieve data from the relational database.

12 Claims, 7 Drawing Sheets

METHOD OF OPTIMIZING A QUERY HAVING AN EXISTI SUBQUERY AND A NOT-EXISTS SUBQUERY

BACKGROUND OF THE INVENTION

1. Field of the Invention

This invention relates in general to database management systems performed by computers, and in particular to the optimization of SQL queries in a relational database management system having an EXISTS subquery and a NOT EXISTS subquery.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

One of the most common SQL queries executed by RDBMS software is the SELECT statement. In the SQL standard, the SELECT statement generally has the format: "SELECT<clause>FROM<clause>WHERE<clause>GROUP BY<clause>HAVING<clause>ORDER BY<clause>." The clauses generally must follow this sequence. Only the SELECT and FROM clauses are required and all other clauses are optional.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause.

The search condition typically comprises one or more predicates, each of which specifies a comparison between two values from certain columns, constants or correlated values. Multiple predicates in the WHERE clause are typically connected by Boolean operators.

The SELECT statement may also include a grouping function indicated by the GROUP BY clause. The GROUP BY clause causes the rows in the intermediate result set to be grouped according to the values specified in the clause. A number of column or aggregate functions are also built into SQL, such as MAX (maximum value in column), MIN (minimum value in column), AVG (average of values in column), SUM (sum of values in column), and COUNT (number of rows).

Queries using aggregate expressions return as many result rows as there exist unique "result groups" in the source of the aggregation. A result group is defined as the set of values contained in the fields of a row corresponding to the list of columns or expressions specified in the GROUP BY clause of the query. The value of the aggregate function is the cumulative result of applying the function to the result of the contained expression for each row having the same result group.

Another operation permitted by SQL is the JOIN operation, which concatenates horizontally all or parts of two or more tables to create a new resulting table. The JOIN operation is implied by naming more than one table in the FROM clause of a SELECT statement.

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation.

In RDBMSs, columns of any type can assume NULL (i.e., unknown) values. In RDBMS software, NULL values are properly handled using tri-value logic (i.e., TRUE, FALSE or UNKNOWN) for predicates, and SQL-based RDBMSs employ such logic.

SQL queries and their resulting table operations can be nested through several levels of predicates such that a higher nested predicate, or level of operation, cannot be evaluated until after a lower level predicate, or operation, has been evaluated. A lower level of SQL operation in an SQL statement is generally referred to as a subquery.

Nested SQL statements may require tuple-by-tuple data manipulation in each subquery for evaluation of the complete statement. For example, each entry of a table column may need to be compared against each entry of a corresponding column in another table to determine if a SELECT operation should retrieve a table row. Such tuple-by-tuple operations are very inefficient and requires simplification and optimization.

In an RDBMS system, users submit SQL queries. The optimizer in the RDBMS optimizes the SQL query and generates an efficient execution plan. Typically, the optimizer adopts a cost-based approach wherein the optimizer generates many possible alternative execution plans, and selects the best/cheapest plan among those generated plans.
Graphical Representation of SQL Queries by Query Graph Model (QGM)

A useful tool in describing SQL queries and their evaluation is a graphical representation of SQL statements known as Query Box Representation (QBR). Known SQL optimizers employ various types of QBR to facilitate their processing and optimization efforts. QBR provides a powerful and manageable representation of queries used to reduce the complexity of query compilation and optimization procedures. Additionally, QBR provides a tool for optimizing queries by facilitating rewriting the QBR components in efficient arrangements.

Generally, a QBR representation employs hierarchically arranged "boxes" to represent subquery operations, such as SELECT and GROUP BY. The interconnections between the boxes define the relationship between different items of data from different subquery operations.

Various techniques may be used to store a complex query in computer memory in accordance with a QBR format.

Specifically, multiple data structures in the memory are used to represent the QBR boxes and interrelationships. These data structures may comprise, for example, records and associated pointers, strings, stack arrangements, doubly linked lists, hashing arrangements, or other suitable formats. Preferably, records and pointers are used, where each record represents a QBR box, and the pointers represent the relationships between the boxes. Each record also includes a listing of various properties associated with the corresponding QBR box.

A number of different types of QBR are known in the art. One of the more popular types of QBR is known as the Query Graph Model (QGM), well known in the art, and described in the following reference, which is incorporated by reference in its entirety: Pirahesh et al., "Extensible/Rule Based Query Rewrite Optimization in Starburst," Proceedings of ACM SIGMOD '92 International Conference on Management of Data, San Diego, Calif., U.S.A., 1992.

The query graph model supports arbitrary table operations where the inputs are tables and outputs are tables. Such operations are SELECT, GROUP BY, UNION, INTERSECT, and EXCEPT operations, as defined in the SQL standard, and the restriction, projection and join operations performed by the SELECT operation.

When a query is represented by the query graph model, each operation of the query may be graphically represented by a box having a head and body. The body of a query graph model box may include "quantifiers", corresponding to table references or derived tables. Quantifiers are labeled with the columns that it needs from the table it ranges over. Quantifiers may have different types. Type "F" (For Each) quantifiers correspond to the table references in the FROM clause of the SQL query. Type "A" (Universal) quantifiers correspond to the ALL subquery in the WHERE clause. Type "E" (Existential) quantifiers correspond to the subquery associated with SQL's predicates EXISTS, IN, ANY, and SOME, which are true if at least one tuple of the subquery satisfies the predicate. In QGM, the quantifiers associated with existential and universal subqueries are called COUNTING quantifiers. Type "S" (Scalar) quantifiers correspond to scalar subqueries. The database system has to enforce the rule that exactly one tuple has to be returned from the scalar subquery. If the subquery does not produce any rows, a tuple with null value(s) will be returned via the S quantifier. On the other hand, if the subquery returns more than one row, a runtime error will be raised. Additionally, quantifiers may be ordered within a box to support asymmetric operators, such as EXCEPT.

The query graph model boxes are coupled to each other by quantifier "edges", also called "arcs". The head of a box describes the output data stream or table produced by the operation, and the body specifies the operation required to compute the output table from records flowing into the body. The head specifies each output column, such as those specified in the SELECT clause of a query, and includes column names, types, and output ordering information. The head, body, and quantifiers of a box may each have a separate attribute called "DISTINCT", to manage the production of duplicate tuples.

Figure 1:
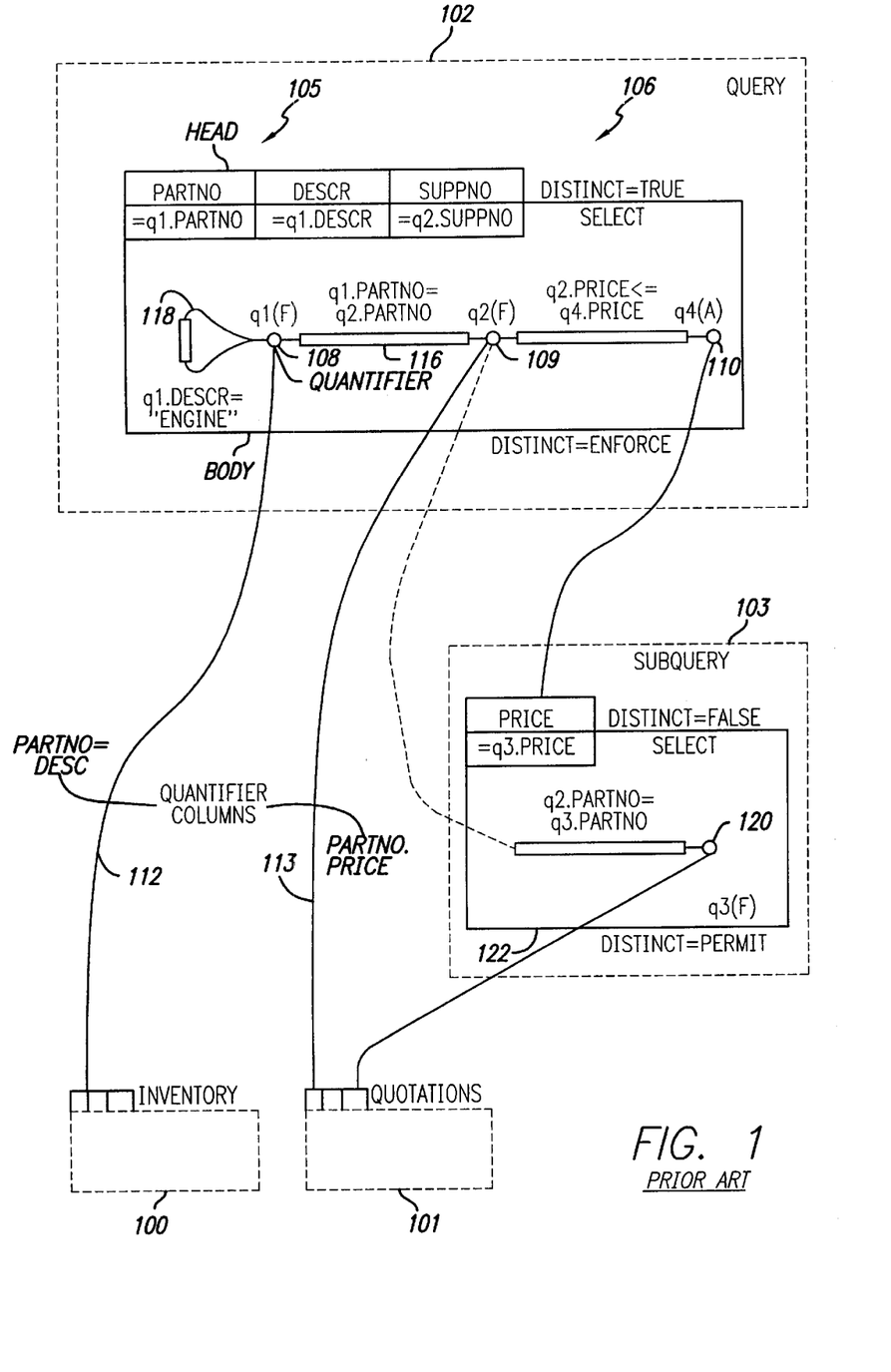
FIG. 1 illustrates the QGM technique, according to the prior art.

FIG. 1 illustrates an exemplary query graph model corresponding to the following SQL query.

SELECT DISTINCT Q1.PARTNO, Q1.DESCR, Q2.SUPPNO
FROM INVENTORY Q1, QUOTATIONS Q2
WHERE Q1.PARTNO=Q2.PARTNO AND Q1.DESCR= 'ENGINE'
AND Q2.PRICE<=ALL (SELECT Q3.PRICE
  FROM QUOTATIONS Q3
  WHERE Q2.PARTNO=Q3.PARTNO)

This query provides information about suppliers and parts for which the supplier price is less than that of all other suppliers. The corresponding query graph model of FIG. 1 contains four boxes 100, 101, 102, 103. Two of the boxes 100 and 101 are associated with the tables INVENTORY and QUOTATIONS, respectively. The third box 102 is a SELECT box representing the main part of the query, and the box 103 is a SELECT box representing the subquery.

In accordance with the query graph model convention, each of the boxes 100–103 has a head and a body, where each head describes the output columns produced by the associated box, and the body specifies the operation required to compute the output. "Base" tables, exemplified by boxes 100–101, are considered to have empty or nonexistent bodies because they do not perform any operations.

Referring in greater detail to the SELECT box 102, a head 105 is shown, specifying output columns PARTNO, DESCR, and SUPPNO which correspond to the SELECT clause of the main query. The specification of these columns includes column names, types, and output ordering information. The head 105 includes a distinct attribute 106, which indicates that the associated table contains only distinct tuples and may not have duplicates.

The body of each non-base table box contains a graph, the vertices of which represent quantified tuple variables, the quantifiers. The vertices, which are represented with dark circles, are also called "nodes". In the box 102, for example, vertices 108–110 correspond to quantifiers Q1, Q2, and Q4. Quantifiers Q1 and Q2 range over the INVENTORY and QUOTATIONS base tables respectively, and correspond to the table references in the FROM clause of the SQL query.

As stated above, arcs (also called "inter-box edges") connect quantifiers to other boxes or to each other. For example, the Q1 and Q2 quantifiers (nodes 108–109) are connected via arcs 112–113 to the heads of the boxes 100–101, respectively. Arcs may also interconnect quantifiers of the same box where each inter-quantifier arc represents a predicate of the WHERE clause in the query block. Such predicates are represented by labeled rectangles along the corresponding edge. Such edges are also called Boolean factors. For example, the Q1 and Q2 quantifiers are interconnected by an edge 116 that represents a join predicate. A looped edge 118 attached to the Q1 (node 108) represents a local predicate on the quantifier Q1. In the head 105 of the box 102, each output column may have an associated expression corresponding to expressions allowed in the SELECT clause of the query. In FIG. 1, all of these expressions are simple identity functions over the referenced quantified columns.

Quantifier Q4 is a UNIVERSAL quantifier is of type A, because it is associated with the ALL subquery in the WHERE clause. This means that for ALL tuples associated with Q4, the predicate represented by the edge between Q2 and Q4 is TRUE.

In Box 3, Q1 and Q2 participate in joins, and some of their columns are used in the output tuples. These quantifiers have type F (ForEach), since they come from the query's FROM clause. Box 4 represents the example's subquery. It contains an F quantifier Q3 over the QUOTATIONS table, and has a predicate that refers to Q2 and Q3.

The body of every box in QGM has an attribute called DISTINCT that may have one of the following values: ENFORCE, PRESERVE or PERMIT. ENFORCE means that the operation must eliminate duplicates in order to enforce head.distinct=TRUE. PRESERVE means that the operation must preserve the number of duplicates it generates. This could happen because head.distinct=FALSE, or because head.distinct=TRUE and no duplicates could exist in the output of the operation, even without duplicate elimination. PERMIT means that the operation is permitted to eliminate (or generate) duplicates arbitrarily. For example, the DISTINCT attribute of Box 4 can have the value PERMIT, because its output is used in a universal quantifier (Q4 in Box 3), and universal quantifiers are insensitive to duplicate tuples.

Like the body of every box, each quantifier also has an attribute called DISTINCT that may have a value of ENFORCE, PRESERVE or PERMIT. ENFORCE means that the quantifier requires the table over which it ranges to enforce duplicate elimination. PRESERVE means that the quantifier requires that the exact number of duplicates in the lower table be preserved. PERMIT means that the table below may have an arbitrary number of duplicates. Existential and universal quantifiers can always have DISTINCT PERMIT, since they are insensitive to duplicates.

RDBMS software supports view definitions, and a view can be used anywhere a table can be used. Views, just like queries and subqueries, may be represented with a QGM, with one or many boxes. When a view is referenced in a query, its QGM becomes part of the QGM graph of the query. Derived tables, which are similar to view definitions, can be defined anywhere a table can be used, and their QGM becomes part of the QGM graph of the query.

In the body of every box, each output column may have an associated expression corresponding to one of the expressions allowed in the select list of the query. These expressions are called head expressions. The output of a box can be used multiple times (e.g., a view may be used multiple times in the same query), creating common subexpressions.

In the remainder of this paper we draw only rough sketches of QGM graphs, omitting details that are not critical to the discussion.

This particular invention is designed to simplify and optimize a query having both an EXISTS subquery and a NOT EXISTS subquery. Conventional decision support systems must handle and process complex queries efficiently. There is a need, especially in a DBMS interactive mode of operation, for the response time to be shortened drastically, even if a large amount of data is being processed. Conventional query optimization techniques include:

1) converting EXISTS subqueries into joins so that different join methods and join orders can be considered;
2) consequently eliminating redundant join operations, because by converting EXISTS subqueries into joins, the chance of eliminating redundant join operation increases;
3) applying decorrelation techniques if the subqueries are correlated;
4) caching subquery results and re-using the caches for subsequent queries or subquery invocations.

Some of these techniques were described in the following publications. Hamid Pirahesh, Joseph Hellerstein, and Waqar Hasan authored "Extensible/Rule Based Query Rewrite Optimization in STARBURST," Proceedings of ACM SIGMOD '92 International Conference on Management of Data, San Diego, Calif., 1992. Cliff Leung, Hamid Pirahesh, Praveen Seshadri, and Joseph Hellerstein authored "Query Rewrite Optimization Rules in IBM DB2 Universal Database," Readings in Database Systems, 3rd Edition, edited by Stonebraker and Hellerstein, 1998.

However, none of the conventional optimization technique addresses the performance issues of a query in which the WHERE clause contains both an "EXISTS" subquery and a "NOT EXISTS" subquery, or EXISTS-equivalent joins, in Boolean factor. Therefore, there is further need in the art for optimization of these queries.

SUMMARY OF THE INVENTION

The foregoing and other objects, features, and advantages of the present invention will be apparent from the following detailed description of the preferred embodiment which makes reference to several drawing figures.

One preferred embodiment of the present invention includes a method of optimizing a query in a computer in which a WHERE clause contains both an "EXISTS" subquery and a "NOT EXISTS" subquery, or their equivalent subqueries.

The method has the following steps:

(a) analyzing the query to determine whether the query includes a WHERE clause which contains an "EXISTS" subquery or the equivalent and a "NOT EXISTS" subquery or the equivalent;

(b) performing a subsumption test to determine whether the subqueries are subsumed or identical;

(c) if identical, adding a FALSE predicate to the WHERE clause of the query;

(d) if subsumed and not identical, performing a transformation of the query to merge the subqueries; and (e) executing the query in the computer to retrieve data from the relational database.

The step (d) of performing the transformation of the query includes the QGM query transformation, and it further has the steps:

stacking the "NOT EXISTS" subquery block (A) on top of the "EXISTS" subquery block (B);

adding to output columns of the block B all columns necessary for the block A;

applying a nullability test to all said columns necessary for the block A;

if not all said columns nullable, designating a non-nullable column as a column C;

if all said columns nullable, adding a column C to said output columns of the block B and filling the column C with a pre-determined constant value;

transforming a compensation predicate CP, obtained during the subsumption test of the step (b), into the form of "(C IS NULL) OR ((C IS NOT NULL) AND CP); and applying the transformed compensation predicate to the block A to merge the subqueries.

Another preferred embodiment of the present invention includes a program storage device storing the query optimization program, according to the method of the present invention.

Yet another preferred embodiment of the present invention includes an apparatus for optimizing a query, according to the method of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

The present invention discloses a method, apparatus and computer program storage device for optimizing a SQL query which contains an "EXISTS" subquery and a "NOT EXISTS" subquery, or EXISTS-equivalent subqueries, in Boolean factor. The EXISTS-equivalent subquery is a subquery that is semantically equivalent to EXISTS or NOT EXISTS subquery. Subqueries that can be replaced by "EXISTS" or "NOT EXISTS" subqueries are referred to herein as EXISTS-equivalent subqueries. In the SQL language, some forms of ALL, ANY, IN, NOT IN, and SOME subqueries are semantically equivalent to some form of EXISTS-type subquery, and are therefore EXISTS-equivalent subqueries. Existential joins are also considered as EXISTS-equivalent subqueries.

The method analyzes the query to determine whether it includes the WHERE clause which contains an "EXISTS" subquery and a "NOT EXISTS" subquery, or EXISTS-equivalent subqueries, in Boolean factor. If so, it performs the subsumption test to determine whether the two subqueries include identical predicate sets. If they are not identical, it determines the compensation predicate and eliminates the EXISTS subquery by merging it into the NOT EXISTS subquery. This improves the query performance by eliminating a subquery altogether and hence allows generation of more efficient execution plans for retrieving data from the relational database.

The preferred embodiment of the present invention discloses an improved optimization technique using the Query Graph Model (QGM).

Hardware and Software Environment

Figure 2:
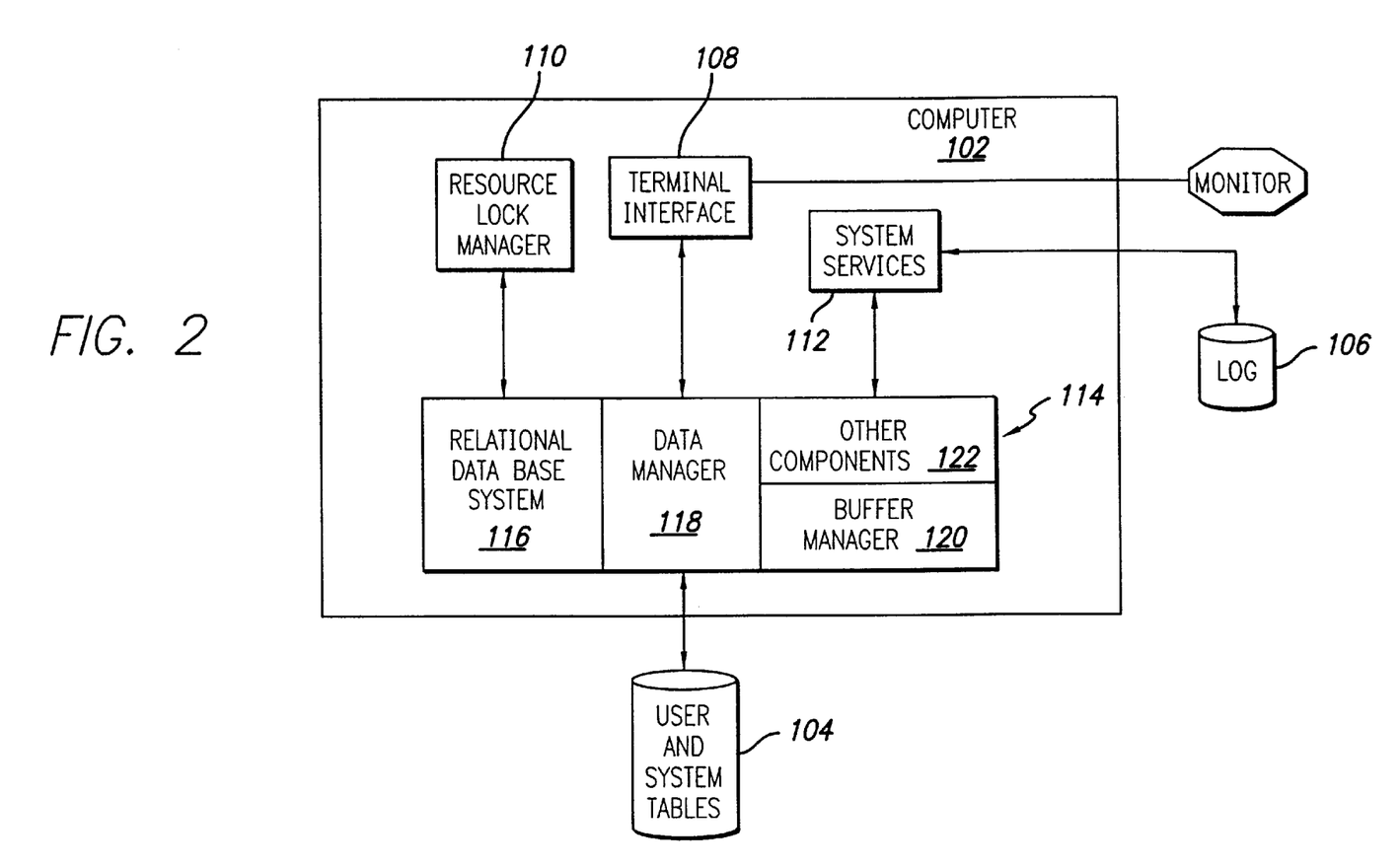
FIG. 2 illustrates a computer hardware and software environment usable in the present invention.

FIG. 2 illustrates an exemplary computer hardware environment that could be used with the present invention. In the exemplary environment, a computer system 102 is comprised of one or more processors with computer memory, connected to one or more electronic storage devices 104 and 106, such as disk drives, that store one or more relational databases. These drives may comprise, for example, optical disk drives, magnetic tapes and/or semiconductor memory.

Operators of the computer system 102 use a standard operator terminal interface 108, such as IMS/DB/DC, CICS, TSO, OS/2 or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL, and may similarly be applied to non-SQL queries.

Figure 3:
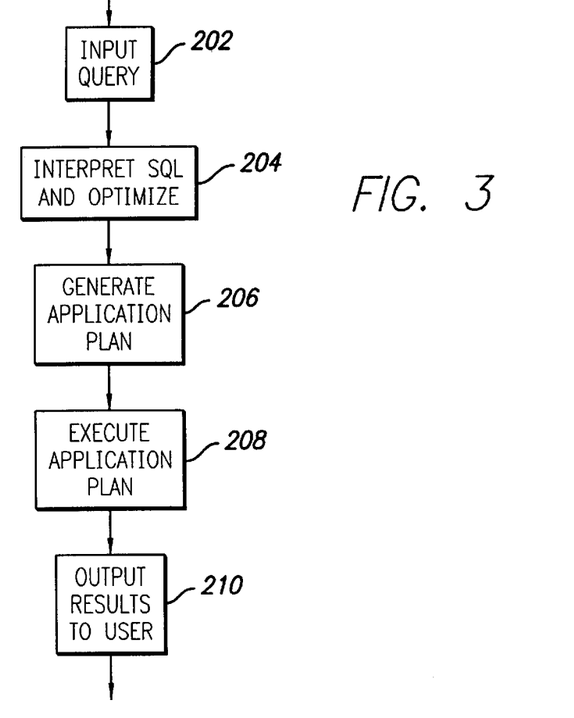
FIG. 3 is a flowchart illustrating the steps for the interpretation and execution of SQL statements in an interactive environment, usable in the present invention.

As illustrated in FIG. 3 the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

FIG. 3 is a flowchart illustrating the steps necessary for the interpretation and execution of SQL statements in an interactive environment, according to the present invention. Block 202 represents the step of accepting the user's input of SQL statements into the computer system 102. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not the instructions on how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 4:
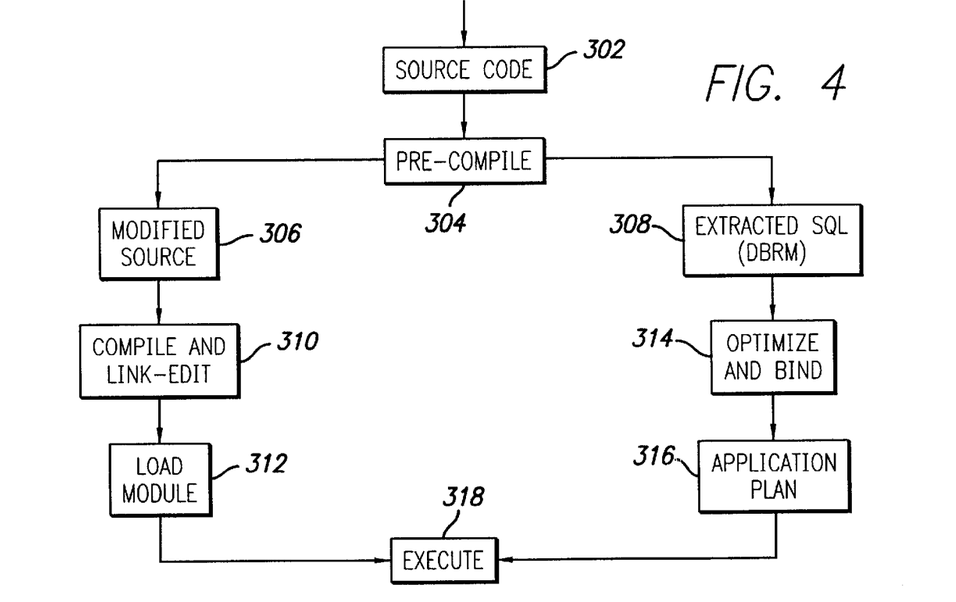
FIG. 4 is a flowchart illustrating the steps for the interpretation and execution of SQL statements in an embedded source code, usable in the present invention.

FIG. 4 is a flowchart illustrating the steps necessary for the interpretation and execution of SQL statements embedded in source code, according to the present invention. Block 302 represents program source code containing a host language (such as COBOL or C) and embedded SQL statements. The program source code is then input to a precompile step 304. There are two outputs from the precompile step 304: a modified source module and a Database Request Module (DBRM) 308. The modified source module 306 contains host language calls to DB2, which the precompile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Those skilled in the art will recognize that any combination of components, including computer hardware, peripherals and other devices, computer system software programs and application programs may be used to implement the present invention, so long as similar functions are performed thereby. Many modifications of the proposed preferred embodiments may be made without departing from the scope of the present invention.

SQL Optimization

The operation of the present invention can be best understood in context, i.e., using a real-world example, such as a data warehouse application, performed by the RDBMS software. Such an application there typically consists of several large tables, each with one or more columns forming the primary or unique key of the table, or equivalently, there is a unique constraint on one or more columns of the table.

In a generic example of such a structure comprising several tables the database architecture consists of suppliers and customers. Customers may order items (parts) which may be supplied many suppliers. Both customers and suppliers table have location information. The tables may be created using the SQL statement as follows:

```
CREATE TABLE    NATION (N_NATIONKEY INTEGER,
                    N_NAME    CHAR(25),
                    N_REGIONKEY INTEGER);
CREATE TABLE    REGION (R_REGIONKEY INTEGER,
                    R_NAME    CHAR(25);
CREATE TABLE    PART (P_PARTKEY INTEGER,
                    P_NAME    VARCHAR(55),
                    P_MFGR    CHAR(25),
                    P_BRAND   CHAR(10),
                    P_TYPE    VARCHAR(25),
                    P_SIZE    INTEGER,
                    P_CONTAINER CHAR(10),
                    P_RETAILPRICE FLOAT);
CREATE TABLE    SUPPLIER (S_SUPPKEY INTEGER,
                    S_NAME    CHAR(25),
                    S_ADDRESS VARCHAR(40),
                    S_NATIONKEY INTEGER,
                    S_PHONE   CHAR(15),
                    S_ACCTBAL    FLOAT);
CREATE TABLE    PARTSUPP (PS_PARTKEY INTEGER,
                    PS_SUPPKEY INTEGER,
                    PS_AVAILQTY INTEGER,
                    PS_SUPPLYCOST FLOAT);
CREATE TABLE    CUSTOMER(C_CUSTKEY INTEGER,
                    C_NAME    VARCHAR(25),
                    C_ADDRESS VARCHAR(40),
                    C_NATIONKEY INTEGER,
                    C_PHONE   CHAR(15),
                    C_ACCTBAL FLOAT,
                    C_MKTSEGMENT CHAR(10));
CREATE TABLE    ORDERS (O_ORDERKEY INTEGER,
                    O_CUSTKEY   INTEGER,
                    O_ORDERSTATUS CHAR(1),
                    O_TOTALPRICE FLOAT,
                    O_ORDERDATE DATE,
                    O_ORDERPRIORITY CHAR(15),
```

-continued

```
                    O_CLERK   CHAR(15),
                    O_SHIPPRIORITY INTEGER);
CREATE TABLE    LINEITEM (L_ORDERKEY INTEGER,
                    L_PARTKEY INTEGER,
                    L_SUPPKEY INTEGER,
                    L_LINENUMBER INTEGER,
                    L_QUANTITY FLOAT,
                    L_EXTENDEDPRICE FLOAT,
                    L_DISCOUNT FLOAT,
                    L_TAX FLOAT,
                    L_RETURNFLAG CHAR(1),
                    L_LINESTATUS CHAR(1),
                    L_SHIPDATE DATE,
                    L_COMMITDATE DATE,
                    L_RECEIPTDATE DATE,
                    L_SHIPINSTRUCT CHAR(25),
                    L_SHIPMODE CHAR(10));
```

The following query Q returns a list of suppliers who kept orders waiting. The query identifies suppliers in Saudi Arabia whose product was part of a multi-supplier order, where they were the only supplier who failed to meet the committed delivery date.

(QUERY Q)
SELECT S_NAME, COUNT(*) AS NUMWAIT
FROM SUPPLIER, LINEITEM L1, ORDERS, NATION
WHERE S_SUPPKEY=$L_1$.L_SUPPKEY
   AND O_ORDERKEY=L1.L_ORDERKEY
   AND L1.L_RECEIPTDATE>L1.L_COMMITDATE
   AND EXISTS (SELECT *
     FROM LINEITEM L2
     WHERE L2.L_ORDERKEY=L1.L_ORDERKEY
     AND L2.L_SUPPKEY<>L1.L_SUPPKEY)
   AND NOT EXISTS (SELECT *
     FROM LINEITEM L3
     WHERE L3.L_ORDERKEY=L1.L_ORDERKEY
     AND L3.L_SUPPKEY<>L1.L_SUPPKEY
     AND L3.L_RECEIPTDATE>L3.L_COMMITDATE)
   AND S_NATIONKEY=N_NATIONKEY
   AND N_NAME='SAUDI ARABIA'
GROUP BY S_NAME In formulating this SOL query, a correlated EXISTS subquery is introduced to make sure that the order in concern has more than one supplier:
(SUBQUERY Q1)
EXISTS (SELECT *
   FROM LINEITEM L2
   WHERE L2.L_ORDERKEY=L1.L_ORDERKEY
   AND L2.L_SUPPKEY<>L1.L_SUPPKEY)
If so, the NOT EXISTS subquery is used to find out whether the other suppliers did not ship the item later than the commit date:
(SUBQUERY Q2)
NOT EXISTS (SELECT *
   FROM LINEITEM L3
   WHERE L3.L_ORDERKEY=L1.L_ORDERKEY
   AND L3.L_SUPPKEY <>L1.L_SUPPKEY
   AND L3.L_RECEIPTDATE>L3.L COMMITDATE)
The QGM of this query is presented in FIG. 5.

Figure 5:
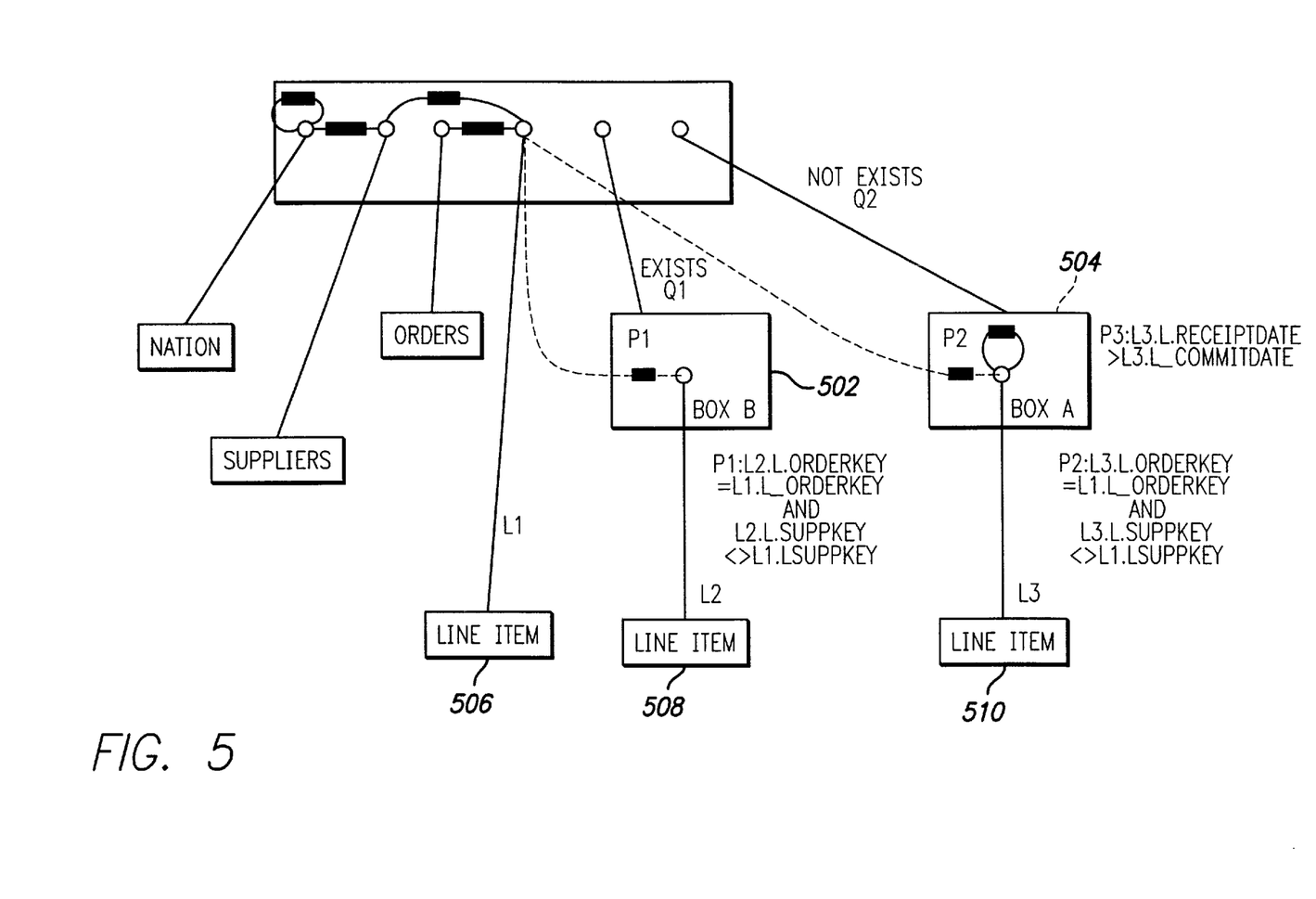
FIGS. 5–6 represent the query graph models of an example provided herein.

Conventional DBMS optimizers will likely evaluate the first subquery of box B 502 and the second subquery of box A 504, and there will be three different accesses to the LINEITEM table: one in the main query, 506, one in the EXISTS subquery, 508, and one in the NOT EXISTS subquery of box B, 510. Even if the EXISTS subquery is converted into a join (which is often done by existing commercial database systems), the LINEITEM table will still be referenced three times.

In the preferred embodiment of the present invention, a technique is presented that allows removal of one reference to the LINEITEM table so that only two references are used. Moreover, the lack of join operations enhances the query performance substantially.

The present invention is based on the observation that the result set that satisfies the correlated EXISTS subquery (LINEITEM L2 in subquery Q1) is a superset of the result set that satisfies the correlated NOT EXISTS subquery (LINEITEM L3 in subquery Q2). Therefore, in the QGM the NOT EXISTS subquery can be stacked on top of the EXISTS subquery, and during the query execution the access to the LINEITEM table will be reduced by one reference.

Figure 6:
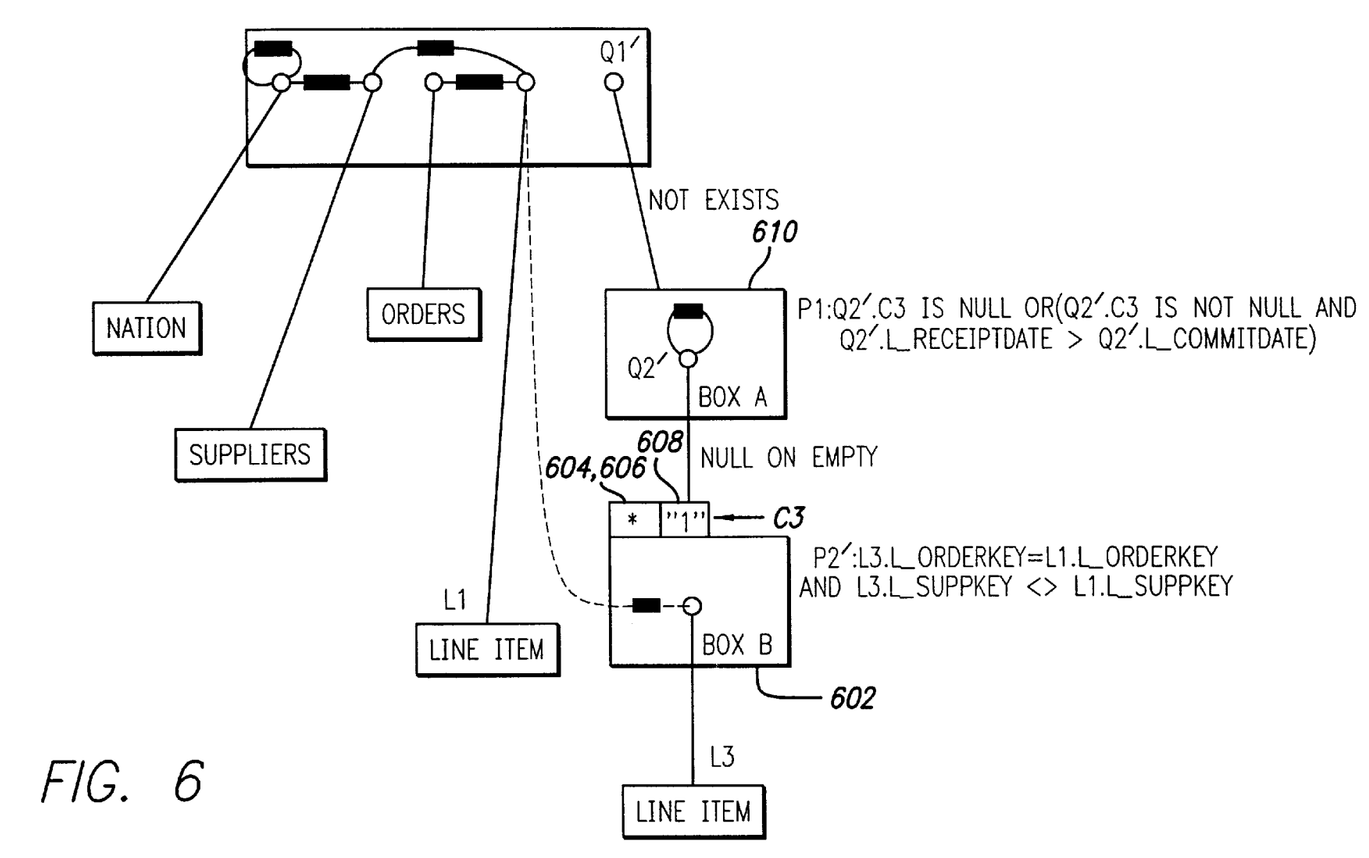

FIG. 6 is a simplified QGM transformation diagram for the rewritten query. The output (head) of box B 602, for the EXISTS subquery, instead of only columns C1 604 and C2 606, further includes a column C3 608:

C1: L_RECEITPDATE

C2: L_COMMITDATE and

C3: 1

The inclusion of an output column C3 608 containing the constant value, such as "1" or some other pre-defined value, is not necessary when one of the other columns in the output is defined as non-nullable. When required, the column C3 608 is used to assure return of at least one row from box B 602 into box A 610, used for NOT EXISTS subquery, indicating that there is a row which satisfies the predicates used in box B 602 and allowing the subquery of box A 610 to be evaluated, by force feeding it, and not filtering it out. The predicate P2' is defined as:

L3.L_ORDERKEY=L1.L_ORDERKEY AND

L3.L_SUPPKEY<>L1.L_SUPPKEY

The quantifier ranging over box B 602 is a regular F quantifier (ForEach) with a property of generating a null row if the input is empty. If there is no match in box B 602, a row of nulls will be fed into box A 610 including the column C3. In this case, the value of C3 will be NULL indicating that there is no match in box B 602. Identifying no match is required because a 'no match' in the EXISTS subquery in the original query means the outer row in the main query block will be filtered out.

The quantifier Q1' remains to be a universal quantifier of type 'A' (for NOT EXISTS subquery of box A 610), and ranges over box A 610 which does not return any columns because the NOT EXISTS subquery does not require return of any column.

The predicate P1' in box A 610 is defined as:

(Q2'.C3 IS NULL) OR ((Q2'.C3 IS NOT NULL) AND (Q2'.L_RECEIPTDATE>Q2'.L_COMMITDATE))

The rewritten query of FIG. 6 retains the same semantics as the original query of FIG. 5. For each row of LINEITEM L1 that satisfies other joins and local predicates, its L_ORDERKEY and L_SUPPKEY values are used as correlation values for evaluating box B 602. There are two situation that may exist in matching the predicates using the table LINEITEM L3, which will return the correlation predicate P2' as TRUE.

If there is no match, in the original query the EXISTS subquery will be FALSE and therefore the row of LINEITEM L1 will be filtered out. In the rewritten query, a null row of the present invention will be fed into box A 610 for evaluation, making the predicate P1' TRUE. Since there is a row generated by box A 610, the NOT EXISTS subquery predicate for the quantifier Q1' is FALSE, by definition. Hence, the said row of LINEITEM L1 will also be filtered out in the rewritten query and the semantics is the same as in the original EXISTS subquery.

If there is at least one match, in the original query the EXISTS subquery will be TRUE and the NOT EXISTS subquery will be evaluated. Its truthfulness depends on whether there is any match based on the predicate P2 (shown in FIG. 5). If there is at least one row such that "L_RECEIPTDATE>L_COMMITDATE" is TRUE, then the NOT EXISTS subquery is FALSE; otherwise it is TRUE. When the NOT EXISTS subquery is TRUE, the row of LINEITEM L1 is selected. In the rewritten query, C3 608 is always 1 (i.e., the predicate "C3 IS NOT NULL" is always TRUE). The predicate "L_RECEIPTDATE>L_COMMITDATE" will thus be applied on all rows returning from box B 602 into box A 610. If the predicate is TRUE for any row, the NOT EXISTS subquery is FALSE; otherwise it is TRUE. Hence, the semantics is the same as in the original NOT EXISTS subquery. From the above discussion, it can be concluded that the query rewritten according to the preferred embodiment of the present invention has the same semantics as the original query. It can be observed that in the original query, the result set that satisfies the correlated EXISTS subquery (LINEITEM L2 in subquery Q1) is a superset of the result set that satisfies the correlated NOT EXISTS subquery (LINEITEM L3 in subquery Q2). This is due to the fact that the NOT EXISTS subquery applies more predicates than the EXISTS subquery. In the above-presented example, the difference is the predicate "L_RECEIPTDATE>L_COMMITDATE". By "stacking" the NOT EXISTS subquery box A 610 on top of the EXISTS subquery box B 602, one reference to the LINEITEM table is eliminated.

In order to determine whether the two subqueries or two subexpressions could be merged into one subquery, the preferred embodiment of the present invention utilizes a well-known technique called "subsumption test".

Using QGM terminology, a SELECT box X is said to be subsumed by another SELECT box Y, if the result set of X is a subset of the result set of Y, and if the output column set of X is a subset of the output column set of Y. In this case the result set of X can be re-derived using the result set of Y.

When the predicate set in box X is a superset of the predicate set in Y, then the SELECT box X filters out more rows since it has more predicates than the box Y.

In the following queries L and M:

L: SELECT*FROM T WHERE C1>0 AND C2>0

M: SELECT*FROM T WHERE C1>0

The result set produced by L is a subset of the result set produced by M, because both queries select rows from the same table T (i.e., table T is a common subexpression), and all predicates in M appear in L. Hence, M subsumes L.

In QGM, query subsumption can be defined in terms of predicate set mapping. In this example a SELECT box A from the query L has a quantifier Q and a SELECT box B from the query M has a quantifier Q', and the quantifiers Q and Q' range over a common subexpression table T, referenced by the SELECT boxes A and B.

The respective predicate sets in queries L and M are:

L: Q.C1>0 and Q.C2>0

M: Q'.C1>0

In this case query L has two predicates in its predicate set and query M has one predicate in its predicate set.

The predicate set mapping rule may be defined as follows: a predicate from a predicate set of one query can be mapped into a corresponding predicate from a predicate set of another query by mapping their corresponding quantifiers if they range over common subexpressions.

For example, the predicate set in the query M can be mapped by mapping the quantifier {Q'} to {Q}, so that the query M becomes:

M: Q.C1>0

Therefore, subsumption can be defined as predicate set mapping, where corresponding predicates are mapped via their respective quantifiers.

For example, if the predicate set in select box B, mapped from the quantifier {Q} to {Q'}, is a subset of the predicate set in select box A, then A is subsumed by B, which means that all the rows produced by A can be found in the result set produced by B. In this case A is a subsumee and B a subsumer.

Since the result set of the subsumee can be re-derived from the subsumer result set, in this example the result set of query L can be obtained by applying the predicate "C2>0" on the result set of query M. The predicate that needs to be applied on the subsumer result set in order to re-derive the subsumee result set is called "compensation predicate".

By definition, a SELECT box X is identical to another SELECT box Y if box X is subsumed by Y and Y is subsumed by X, i.e., there is no need for a compensation predicate. This test does not require that all output columns of box X are identical to output columns of box Y, but only that the boxes are mutually subsumed in each other in terms of the rows produced.

Referring to FIG. 5, the topmost SELECT box has a quantifier Q1 ranging over the SELECT box B 502 (an EXISTS subquery), and a quantifier Q2 ranging over the SELECT box A 504. By the query subsumption defined above, box A 504 is subsumed by box B 502, meaning that all the rows produced by box B 502 are a subset of the result set produced by box A 504. The compensation predicate of the original query is defined as "L RECEIPTDATE>L_COMMITDATE". In query Q the box A 504 and box B 502 have a quantifier which ranges over a common subexpression, the table LINEITEM.

Referring to the QGM transformation of FIG. 6, the box B 602 behaves like the EXISTS subquery and outputs rows to box A 610. The compensation predicate as applied in box A 610 is modified to: "(C3 IS NULL) OR ((C3 IS NOT NULL) AND (L_RECEIPTDATE>L_COMMITDATE))."

If the subqueries are identical, the query is transformed by adding a FALSE predicate (e.g., 1=0) to the WHERE clause of the query.

Another simple situation exists when the predicate set in box X is more restrictive than the predicate set in box Y. For example:

L: SELECT*FROM T WHERE C1>10
M: SELECT*FROM T WHERE C1>0

The result set produced by L is a subset of the result set produced by M and, therefore, M subsumes L.

Generally, the method embodiment of the present invention is applied to the query which includes the WHERE clause which contains an "EXISTS" subquery and a "NOT EXISTS" subquery, or EXISTS-equivalent subqueries, in Boolean factor. If there is an EXISTS-equivalent subquery instead of an EXISTS or NOT EXISTS subquery, it has to be transformed to the corresponding EXISTS or NOT EXISTS subquery. The transformed queries produced by this technique may be processed more efficiently by database applications than the original queries.

With this method there is no requirement for storing any results in a temporary table or file, and hence there is no performance penalty, and yet the EXISTS subquery can be removed all together, resulting in performance gain.

Figure 7:
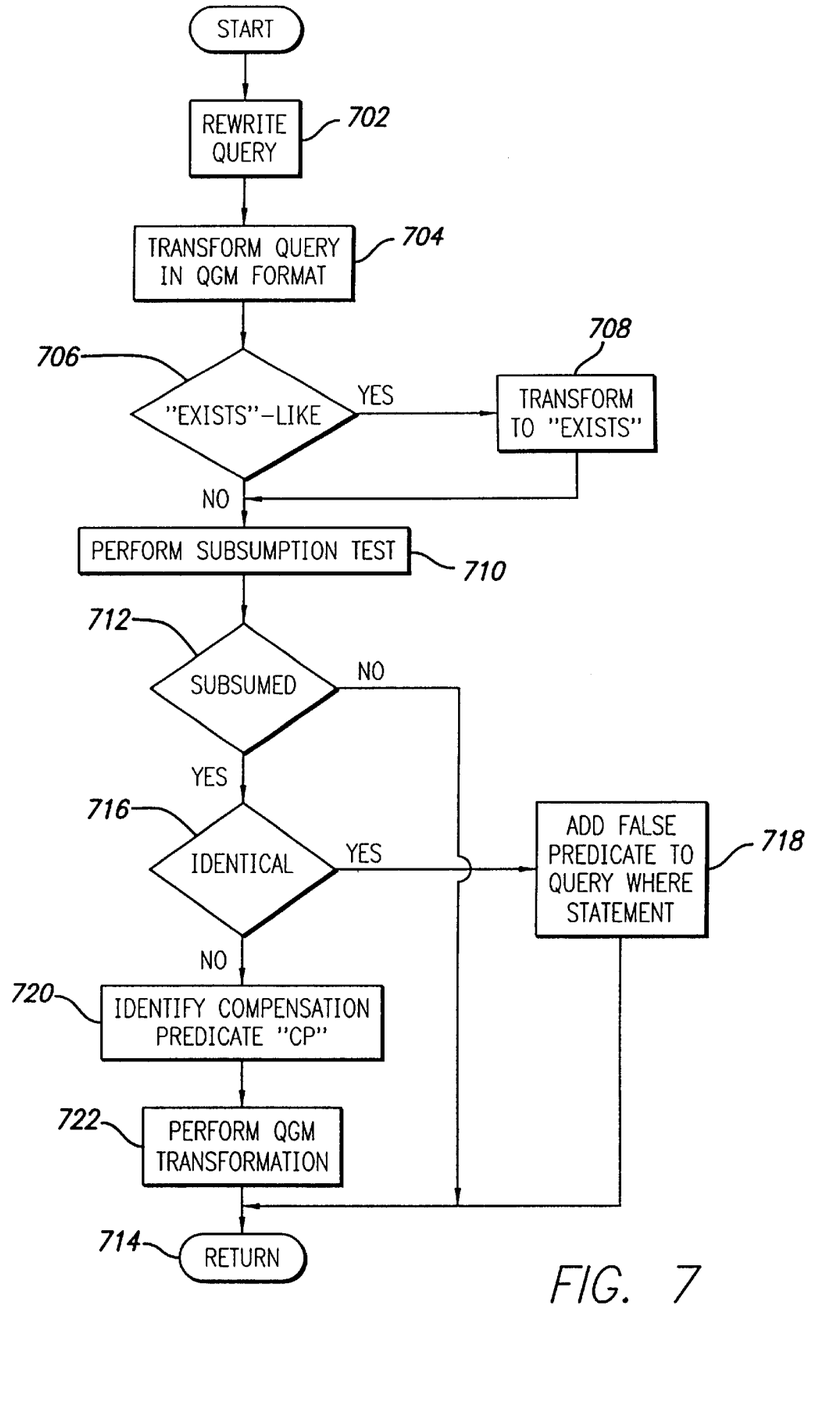
FIGS. 7–8 are flowcharts illustrating the method of optimizing SQL queries in steps 204 of FIG. 3 and 314 of FIG. 4, according to the present invention.

FIG. 7 is a flowchart illustrating the method of optimizing SQL queries in steps 204 of FIG. 3 and 314 of FIG. 4 according to the present invention. Block 702 represents the RDMBS software accepting the query in the memory of the computer 102. The query should include a WHERE clause which contains an "EXISTS" subquery block (represented in QGM as box B and below) and a "NOT EXISTS" subquery block (represented in QGM as box A and below), or EXISTS-equivalent subqueries, in Boolean factor. Block 704 represents the RDBMS software transforming a query into the QGM format.

If the software of block 706 finds that there is an EXISTS-equivalent subquery instead of an EXISTS or NOT EXISTS subquery, for example, an equivalent join, it is transformed in the software of block 708 to the corresponding EXISTS or NOT EXISTS subquery. Block 710 represents the RDBMS software for performing the subsumption test on two subqueries. If the software of block 712 finds that the subqueries are not subsumed, the RDBMS software returns in block 714. Block 716 represents the RDBMS software analyzing the query to determine whether the subqueries are identical.

If so, block 718 represents the RDBMS software transforming the query by adding a FALSE predicate to the WHERE clause of the query, and returns. If not identical, the software of block 720 determines the compensation predicate CP. Block 722 represents the software for the QGM transformation of the query, as shown in FIG. 8, after which the software returns in block 714 to block 204 in FIG. 3 or block 314 in FIG. 4 for subsequent processing steps, including the execution of the SQL query against the relational database and the output of the result set.

Figure 8:
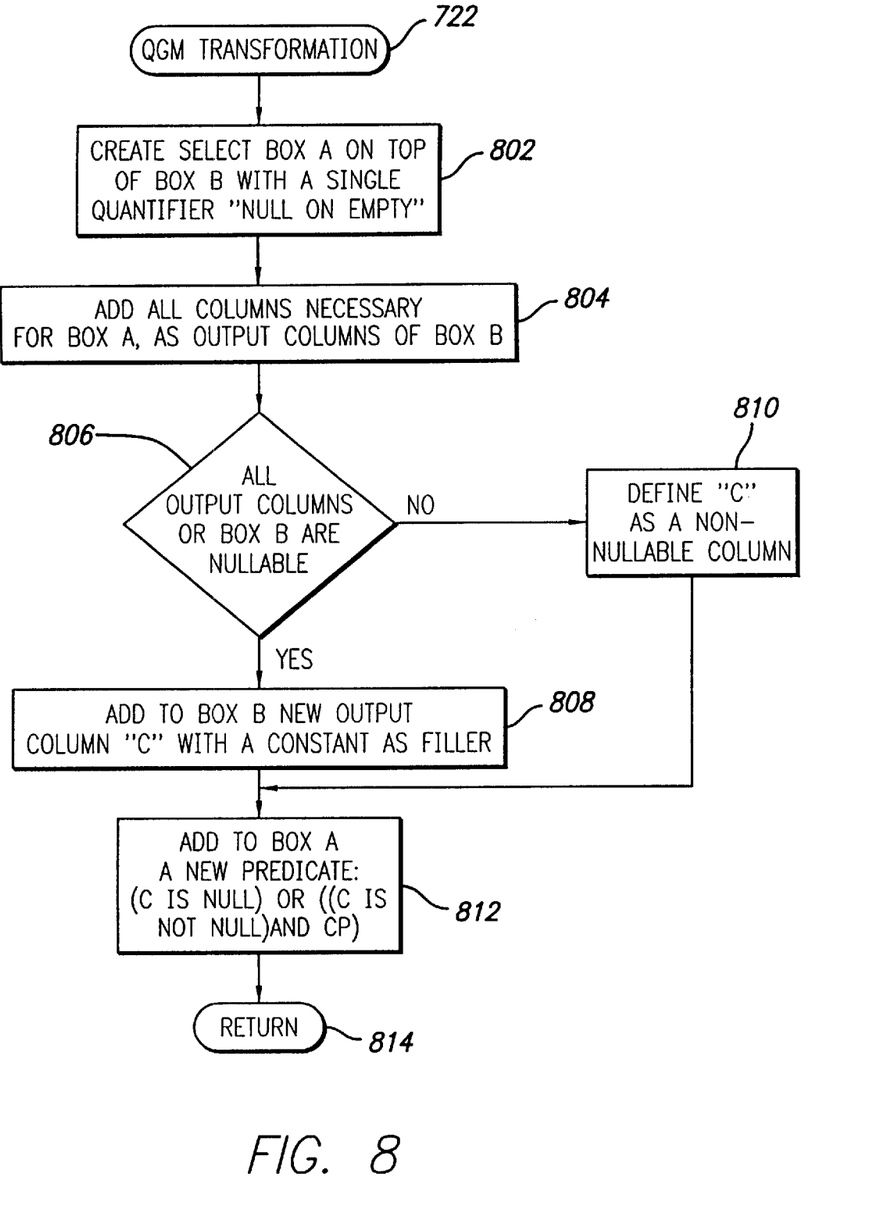

FIG. 8 is a flowchart illustrating the method of QGM transformation of the query. Block 802 represents the software for merging and stacking the subquery box A on top of box B for the other subquery. The box B has a single quantifier with the property that a row of null values will be returned if the input table is empty. Block 804 represents the software for adding the columns necessary for box A as output columns of box B. Block 806 represents the software for testing whether all output columns of box B are nullable. If so, the software of block 808 adds the new output column C to box B with a constant value, such as "1". If not so, the software of block 810 designates a non-nullable column as column C. Next, the software of block 812 adds a modified compensation predicate, in the form of "(C IS NULL) OR ((C IS NOT NULL) AND CP), to the box A, where CP is the compensation predicate determined in step 720 of FIG. 7. This operation identifies the compensation predicate that eliminates the EXISTS subquery by merging it into the NOT EXISTS subquery. Then, in step 814 the software returns control to block 714 of FIG. 7.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer, the query being performed by the computer to retrieve data from a relational database stored in an electronic storage device coupled to the computer, the method comprising the steps of:
(a) analyzing the query to determine whether the query includes a WHERE clause which contains an "EXISTS" subquery or the equivalent and a "NOT EXISTS" subquery or the equivalent;
(b) performing a subsumption test to determine whether the subqueries are subsumed or identical;
(c) if identical, adding a FALSE predicate to the WHERE clause of the query;
(d) if subsumed and not identical, performing a transformation of the query to merge the subqueries; and
(e) executing the query in the computer to retrieve data from the relational database.

2. The method according to claim 1, wherein the step (a) further comprises the steps of:
determining whether the "EXISTS" subquery is presented with an equivalent; and
if so, transforming the EXISTS-equivalent subquery into an "EXISTS" subquery.

3. The method according to claim 1, wherein the step (a) further comprises the steps of:
determining whether the "NOT EXISTS" subquery is presented with an equivalent; and
if so, transforming the NOT EXISTS-equivalent subquery into an "NOT EXISTS" subquery.

4. The method according to claim 1, wherein the step (d) of performing the transformation of the query including the QGM query transformation and the step (d) further comprises the steps of:
stacking the "NOT EXISTS" subquery block (A) on top of the "EXISTS" subquery block (B);
adding to output columns of the block B all columns necessary for the block A;
applying a nullability test to all said columns necessary for the block A;
if not all said columns nullable, designating a non-nullable column as a column C;
if all said columns nullable, adding a column C to said output columns of the block B and filling the column C with a pre-determined constant value;
transforming a compensation predicate CP, obtained during the subsumption test of the step (b), into the form of "(C IS NULL) OR ((C IS NOT NULL) AND CP); and
applying the transformed compensation predicate to the block A to merge the subqueries.

5. An apparatus for optimizing a query, comprising:
a computer having an electronic storage device coupled thereto for storing a relational database, the query being performed by the computer to retrieve data from the relational database;
means, performed by the computer, for analyzing the query to determine whether the query includes a WHERE clause which contains an "EXISTS" subquery or the equivalent and a "NOT EXISTS" subquery or the equivalent;
means, performed by the computer, for performing a subsumption test to determine whether the subqueries are subsumed or identical;
means, performed by the computer, for adding a FALSE predicate to the WHERE clause of the query;
means, performed by the computer, for performing a transformation of the query to merge the subqueries; and
means, performed by the computer, for executing the query in the computer to retrieve data from the relational database.

6. The apparatus according to claim 5, wherein the means for analyzing the query further comprises:
means, performed by the computer, for determining whether the "EXISTS" subquery is presented with an equivalent; and
means, performed by the computer, for transforming the EXISTS-equivalent subquery into an "EXISTS" subquery.

7. The apparatus according to claim 5, wherein the means for analyzing the query further comprises:
means, performed by the computer, for determining whether the "NOT EXISTS" subquery is presented with an equivalent; and
means, performed by the computer, for transforming the NOT EXISTS-equivalent subquery into an "NOT EXISTS" subquery.

8. The apparatus according to claim 5, wherein the means for performing the transformation of the query further including the QGM query transformation means and comprises:
means, performed by the computer, for stacking the "NOT EXISTS" subquery block (A) on top of the "EXISTS" subquery block (B);
means, performed by the computer, for adding to output columns of the block B all columns necessary for the block A;
means, performed by the computer, for applying a nullability test to all said columns necessary for the block A;
means, performed by the computer, for designating a non-nullable column as a column C;
means, performed by the computer, for adding a column C to said output columns of the block B and filling the column C with a pre-determined constant value;
means, performed by the computer, for transforming a compensation predicate CP, obtained during the subsumption test, into the form of "(C IS NULL) OR ((C IS NOT NULL) AND CP); and
means, performed by the computer, for applying the transformed compensation predicate to the block A to merge the subqueries.

9. A program storage device readable by a computer tangibly embodying a program of instructions executable by the computer to perform method steps for optimizing a query, the query being performed by the computer to retrieve data from a relational database stored in an electronic storage device coupled to the computer, the method comprising the steps of:
(a) analyzing the query to determine whether the query includes a WHERE clause which contains an "EXISTS" subquery or the equivalent and a "NOT EXISTS" subquery or the equivalent;
(b) performing a subsumption test to determine whether the subqueries are subsumed or identical;
(c) if identical, adding a FALSE predicate to the WHERE clause of the query;
(d) if subsumed and not identical, performing a transformation of the query to merge the subqueries; and
(e) executing the query in the computer to retrieve data from the relational database.

10. The program storage device according to claim 9, wherein the step (a) further comprises the steps of:

determining whether the "EXISTS" subquery is presented with an equivalent; and if so, transforming the EXISTS-equivalent subquery into an "EXISTS" subquery.

11. The program storage device according to claim 9, wherein the step (a) further comprises the steps of:

determining whether the "NOT EXISTS" subquery is presented with an equivalent; and if so, transforming the NOT EXISTS-equivalent subquery into an "NOT EXISTS" subquery.

12. The program storage device according to claim 9, wherein the step (d) of performing the transformation of the query including the QGM query transformation and the step (d) further comprises the steps of:

stacking the "NOT EXISTS" subquery block (A) on top of the "EXISTS" subquery block (B);

adding to output columns of the block B all columns necessary for the block A;

applying a nullability test to all said columns necessary for the block A;

if not all said columns nullable, designating a non-nullable column as a column C;

if all said columns nullable, adding a column C to said output columns of the block B and filling the column C with a pre-determined constant value;

transforming a compensation predicate CP, obtained during the subsumption test of the step (b), into the form of "(C IS NULL) OR ((C IS NOT NULL) AND CP); and applying the transformed compensation predicate to the block A to merge the subqueries.

* * * * *